United States Patent [19]

Young et al.

[11] Patent Number: 5,004,141
[45] Date of Patent: Apr. 2, 1991

[54] FASTENER FEEDING AND DRIVING APPARATUS

[75] Inventors: Alfred Young, Hickory; Fred E. Church, Newton, both of N.C.

[73] Assignee: Design Tool, Inc., Hickory, N.C.

[21] Appl. No.: 472,602

[22] Filed: Jan. 30, 1990

Related U.S. Application Data

[63] Continuation-in-part of Ser. No. 260,239, Oct. 20, 1988.

[51] Int. Cl.⁵ .......................... B23P 11/00; B25C 1/04
[52] U.S. Cl. ..................................... 227/112; 227/130; 227/149
[58] Field of Search ................. 227/112, 130, 149

[56] References Cited

U.S. PATENT DOCUMENTS

| | | |
|---|---|---|
| 1,703,458 | 2/1929 | Ruff . |
| 1,980,967 | 11/1934 | De Mooy . |
| 2,534,140 | 12/1950 | Moore . |
| 2,951,516 | 9/1960 | Chilton . |
| 2,973,021 | 2/1961 | Crossen . |
| 2,994,880 | 8/1961 | Willis . |
| 3,161,274 | 12/1964 | Lanz . |
| 3,247,874 | 4/1966 | MacDonald . |
| 3,261,526 | 7/1966 | Novak .............. 227/112 X |
| 3,283,985 | 11/1966 | Willis . |
| 3,305,155 | 2/1967 | Willis . |
| 3,494,393 | 2/1970 | Casanov . |
| 3,540,622 | 11/1970 | Spisak . |
| 3,554,403 | 1/1971 | Ginther . |
| 3,587,683 | 6/1971 | Bangerter . |
| 3,875,982 | 4/1975 | Mizu et al. . |
| 3,895,431 | 7/1975 | Froehlking . |
| 3,900,131 | 8/1975 | Ehrlich . |
| 3,906,615 | 9/1975 | Campbell, Jr. et al. ........ 222/112 X |
| 3,930,808 | 1/1976 | Miller et al. . |
| 3,946,926 | 3/1976 | Willis . |
| 3,958,614 | 5/1976 | Bandera . |
| 3,963,456 | 6/1976 | Tsuchiya et al. . |
| 4,114,663 | 9/1978 | Viner . |
| 4,278,184 | 7/1981 | Willis . |
| 4,333,367 | 6/1982 | Taffer . |
| 4,625,597 | 12/1986 | Cast . |

*Primary Examiner*—Paul A. Bell
*Attorney, Agent, or Firm*—Bell, Seltzer, Park & Gibson

[57] ABSTRACT

An automatic fastener feeding and driving apparatus is disclosed which includes a vibrating feed hopper, and a fastener feed assembly for receiving the fasteners from the hopper and serially delivering the fasteners to a delivery line which leads to an automatic hand held driver. The fastener feed assembly comprises a body member having a slide for transverse sliding movement between a first position wherein a fastener is received in a notch in the slide, and a second position where the fastener is delivered to a discharge opening which leads to the discharge line and to the driver. The body member and the slide include an internal air line system by which air is delivered into the lower portion of the notch of the slide and into the discharge opening, only after the slide has essentially reached its discharge position. This timing of the delivered air avoids undue pressurization and turbulence in the discharge line prior to the entry of the fastener, which can interfere with the gravity drop of the fastener into the line. A novel control system for operating the feed slide is also disclosed, which includes a four way air valve which is controlled by the operation of the trigger of the driver.

18 Claims, 5 Drawing Sheets

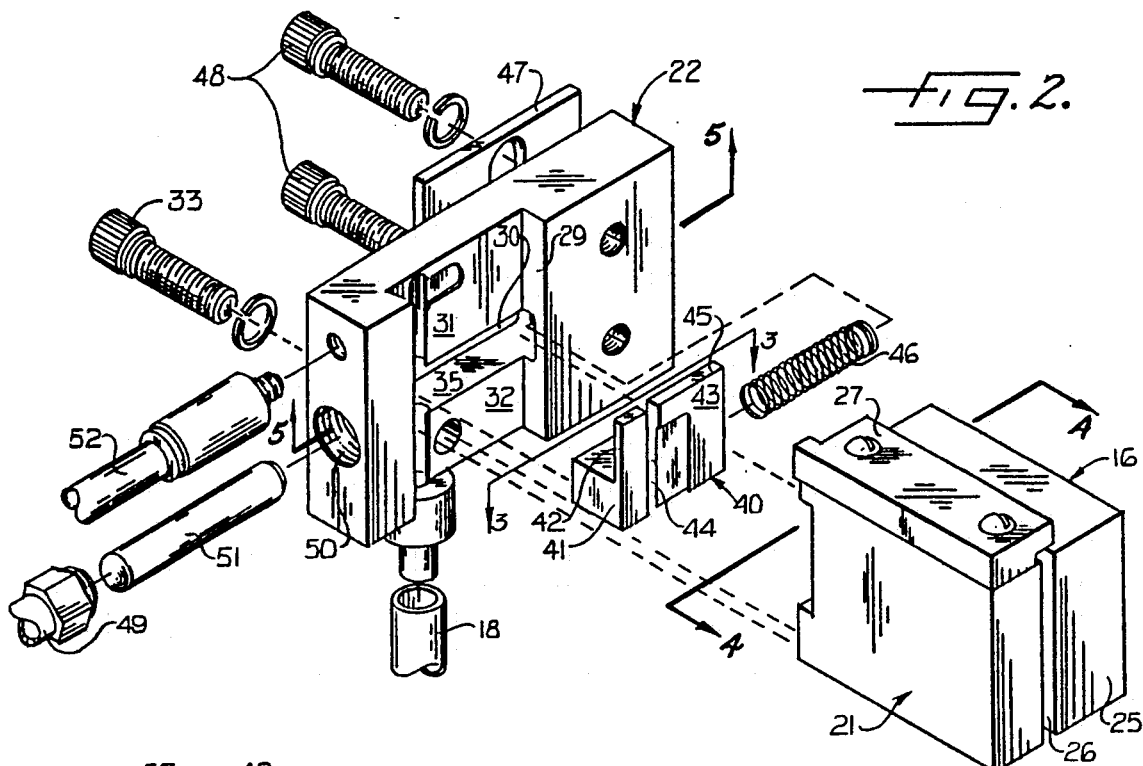
fig. 2.
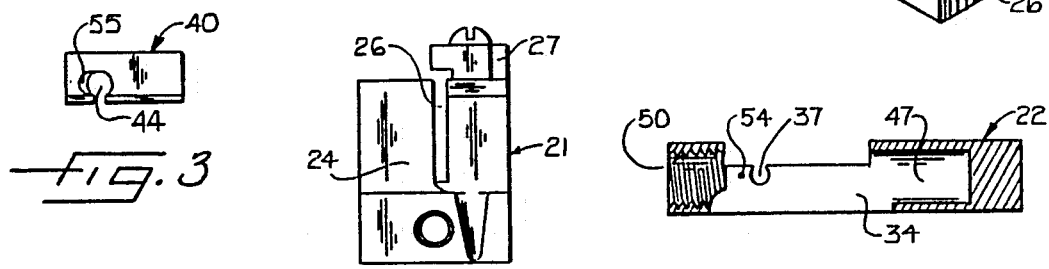
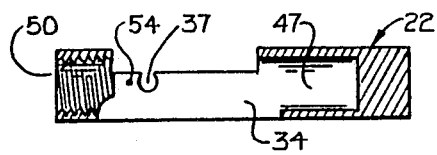
fig. 3.  fig. 4.  fig. 5.
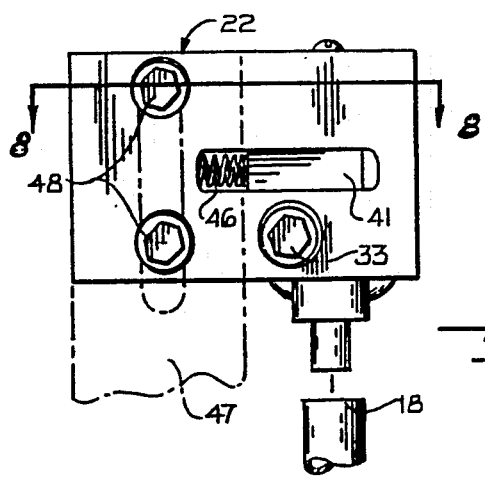
fig. 6.
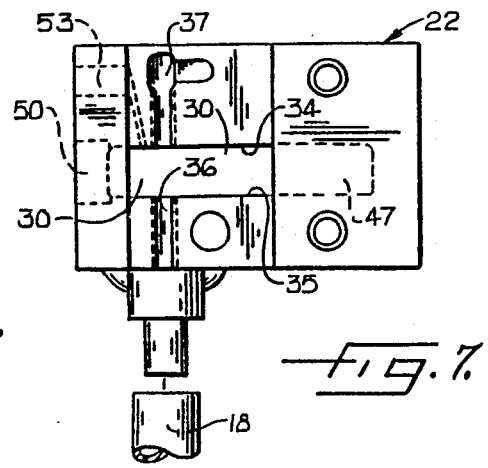
fig. 7.

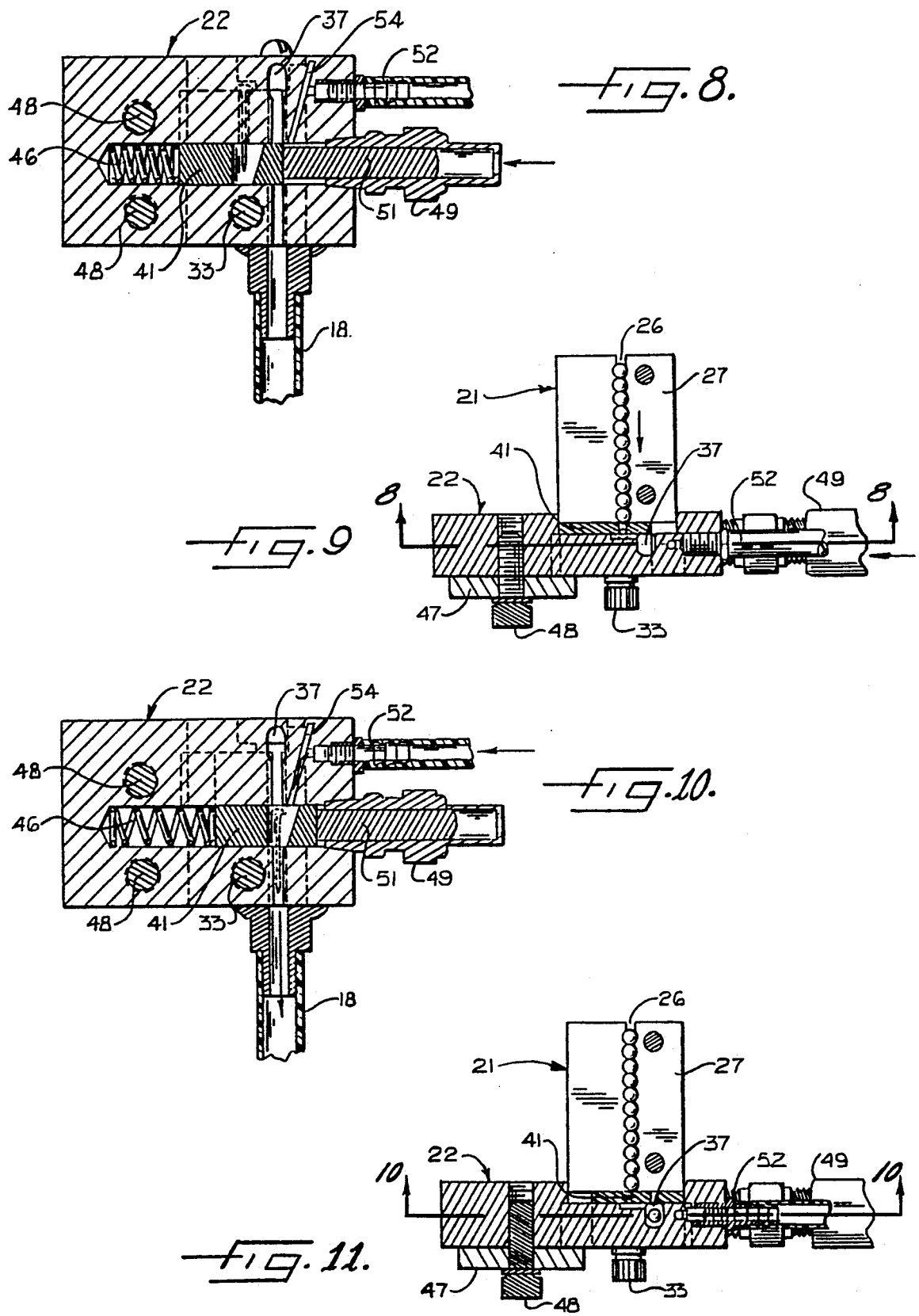

FASTENER FEEDING AND DRIVING APPARATUS

CROSS REFERENCE TO RELATED APPLICATIONS

This is a continuation-in-part of copending application Ser. No. 07/260,239, filed Oct. 20, 1988.

BACKGROUND OF THE INVENTION

The present invention relates to a fastener feeding and driving apparatus which is designed to serially drive fasteners into a workpiece. Apparatus of this type typically comprise a vibrating feed hopper, and a feed or escapement assembly for receiving the fasteners from the deliver chute of the hopper and for serially delivering the fasteners through a discharge tube to a hand held power driven tool. Apparatus of this general type are further described, for example, in the U.S. patents to Willis, U.S. Pat. No. 4,278,184; McDonald, U.S. Pat. No. 3,247,847; and Viner, U.S. Pat. No. 4,114,663.

While the known apparatus are generally suitable for their intended use, the control systems for actuating the various components of the apparatus are often complex and unreliable. Also, the feed or escapement assemblies for feeding the fasteners to the power driven tool are susceptible to jamming. As a specific example, a fastener feed assembly of known design incorporates a slide which is moved by a spring laterally to a fastener pickup position when the trigger on the driver is released. When the trigger is closed, the slide is moved by air pressure laterally to a discharge position such that the fastener drops into the delivery line leading to the driver. Also, air is blown into the opening of the delivery line as the slide moves laterally, and upon the fastener reaching the delivery line, the fastener is thereby blown into the delivery line. In this prior apparatus, the air delivered into the delivery line becomes pressurized, and it may become turbulent before the fastener drops into the delivery line, and these conditions can result in the fastener becoming hung up and unable to drop into the delivery line. This in turn can result in the jamming of the mechanism, particularly if the trigger is again closed by the user of the apparatus.

It is accordingly an object of the present invention to provide a fastener feeding and driving apparatus of the described type which effectively overcomes the above noted limitations and disadvantages of the known equipment.

It is a more particular object of the present invention to provide a fastener feeding and driving apparatus having a simplified and reliable control system for actuating the various components of the apparatus.

It is still another object of the present invention to provide a fastener feeding and driving apparatus having a fastener feeding assembly which is capable of highly reliable operation, and which is of relatively simple construction so as to minimize its cost.

SUMMARY OF THE INVENTION

The above and other objects and advantages of the present invention are achieved in the embodiment illustrated herein by the provision of an automatic fastener feeding and driving apparatus which comprises a source of pressurized air, and air supply line connected to the source. Fastener supply means is provided which includes an outlet chute, and vibratory means for serially supplying fasteners along the chute. Also, a fastener feeding means is connected to the outlet chute for serially delivering fasteners from the chute to a fastener delivery line. The feeding means includes a slide mounted for movement between a pick-up position engaging the leading fastener in the chute and a discharge position wherein the engaged fastener is moved into the fastener delivery line. A fastener driver is provided which comprises a housing which includes a forward barrel portion, the barrel portion having a fastener inlet opening which is connected to the fastener delivery line for receiving a fastener into the barrel portion, and a plunger which is mounted for longitudinal movement within the housing so as to be adapted to move forwardly through the barrel portion and drive a fastener which is positioned in the barrel portion into a workpiece. Air valve means is operatively connected to the air supply line and to the fastener feeding means, and the air valve means is selectively movable between a first position wherein the feeding means is moved to its pick-up position, and a second position wherein the feeding means is moved to its discharge position and air is injected into the fastener delivery line from the source of pressurized air to deliver a fastener therein through the inlet opening and into the barrel portion of the driver. Trigger means is mounted on the driver for when closed causing the plunger to rapidly move forwardly through the barrel portion of the driver and causing the air valve means to move to its first position, and when open causing the air valve means to move to the second position and the plunger to return in the rearward direction.

In the preferred embodiment the trigger means includes a trigger mounted on the driver, an air control line connected between the driver and the air valve means, and control means in the driver for selectively interconnecting the air control line to the source of pressurized air upon actuation of the trigger, so as to selectively actuate the air valve means.

The fastener feeding means preferably comprises a body member having a longitudinal slot adapted to serially receive fasteners from the delivery chute, a discharge opening positioned transversely from the slot and connected to the fastener delivery line, and with the slide being mounted for transverse sliding movement in a transverse slot in the body member. The slide has a front transverse surface facing the longitudinal slot, and with the front transverse surface having a notch therein which is adapted to receive the shank of a fastener therein, and with the slide being transversely slidable between a first position wherein the notch is aligned with the longitudinal slot so as to be adapted to receive a fastener from the longitudinal slot, and a second position wherein the notch is aligned with the discharge opening. Spring biasing means is provided for biasing the slide toward one of the first and second positions, and a first air line is provided for when pressurized moving the slide toward the other of the first and second positions against the force of the spring biasing means. Also, a second air line is provided within the body member and which includes an outlet opening in the body member and a communicating guide channel in the slide so as to be adapted to direct a stream of air into only the lower portion of the notch, i.e. the portion which is immediately adjacent the discharge opening, and then into the discharge opening, only when the side is essentially in the second position.

BRIEF DESCRIPTION OF THE DRAWINGS

Some of the objects and advantages of the present invention having been stated, others will appear as the description proceeds, when taken in conjunction with the accompanying drawings, in which

FIG. 2 is an exploded perspective view of the fastener feed assembly of the present invention;

FIG. 3 is a top plan view of the slide of the fastener feed assembly;

FIGS. 4 and 5 are fragmentary sectional views taken substantially along the lines 4—4 and 5—5 of FIG. 2 respectively;

FIG. 6 is a front elevation view of the fastener feed assembly;

FIG. 7 is a front elevation view of the plate-like member of the feed assembly;

FIG. 8 is a sectional view of the fastener feed assembly taken substantially along the line 7—7 of FIG. 9, and with the slide in the pick-up position;

FIG. 9 is a sectional plan view of the fastener feed assembly taken substantially along the line 8—8 of FIG. 6;

FIGS. 10 and 11 are views similar to FIGS. 8 and 9 respectively, but with the slide in the discharge position;

DETAILED DESCRIPTION OF THE PREFERRED EMBODIMENTS

Figure 1:
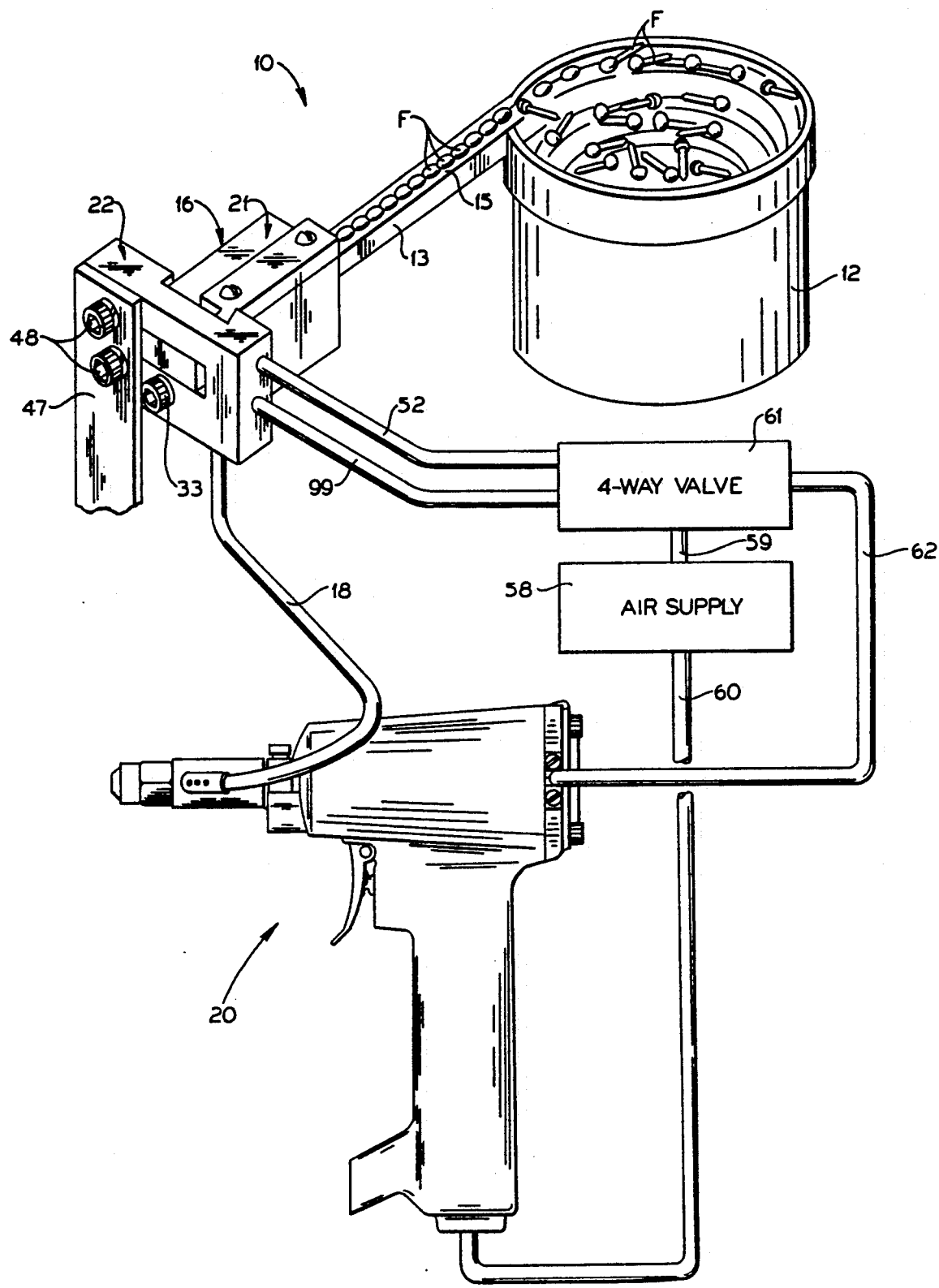
FIG. 1 is a somewhat schematic view of a fastener feeding and driving apparatus in accordance with the present invention.

Referring more particularly to the drawings, FIG. 1 illustrates a fastener feeding and driving apparatus 10 which embodies the present invention, and which is adapted to serially drive fasteners F into a workpiece. In the illustrated embodiment, the fasteners F are escutcheon pins of a type having a pointed shank and an enlarged head at the opposite end of the shank. Pins of this type typically have a length of between ⅜ and ⅝ inches.

The apparatus 10 comprises a vibrating hopper 12 of conventional design, and which is adapted to deliver the fasteners F serially along a delivery chute 13. The chute 13 includes a depending slot for receiving the shanks of the fasteners, and an upper surface 15 which supports the heads of the depending fasteners.

A fastener feed assembly 16 is connected to the outlet chute 13 for serially delivering the fasteners from the chute to a fastener delivery line 18 which leads to a hand held driver 20, as further described below.

As best seen in FIG. 2, the fastener feed assembly 16 comprises a block-like member 21 and a plate-like member 22, which are interconnected to each other. The block-like member 21 includes an inner end surface 24 (FIG. 4) and an outer end surface 25, with a longitudinal slot 26 extending between the inner and outer surfaces. The member 21 is positioned adjacent the discharge end of the chute 13, so that the slot 26 of the member 21 is aligned with that of the chute. Also, a cover 27 is mounted to the upper surface of the block-like member 21, so as to retain the fasteners in the slot 26 in the manner best seen in FIG. 4.

The plate-like member 22 has a vertically extending channel 29 which extends across the inner face thereof, and a transverse slot 30 which extends entirely through the member where it crosses the channel. The transverse slot 30 thus divides the plate-like member into an upper body portion 31 located above the transverse slot 30, and a lower body portion 32 below the slot. The upper and lower body portions have respective forwardly facing coplanar surfaces which are defined by the vertical channel 29. The inner end surface 24 of the block-like member 21 is adapted to be mounted within the channel 29 by a bolt 33, and so as to oppose the forwardly facing surfaces.

The transverse slot 30 of the member 22 includes parallel upper and lower edge surfaces 34, 35 respectively, and which oppose each other. Also, the lower body portion 32 includes a fastener discharge opening in the form of a vertical slot 36 formed in the forwardly facing surface, and the upper body portion 31 includes an aligned discharge slot 37 for the purposes described below.

The feed assembly 16 further comprises a slide 40 which is mounted for transverse sliding movement in the transverse slot 30 of the member 22 The slide 40 is of generally "b" shape in cross section as best seen in FIG. 2, and it includes a lower portion 41 of generally rectangular cross section and which is configured to be closely received in the transverse slot 30. A flange portion 42 extends upwardly from one side of the lower portion 41, and such that the outer face of the flange portion and the coplanar side of the lower portion define a front transverse surface 43 which is visible in FIG. 2 and which faces the end surface 24 of the block-like member 21, and thus the longitudinal slot 26. The opposite face of the flange portion 42 overlies and is in contact with the forwardly facing surface of the upper body portion 31 of the member 22. In addition, the front transverse surface of the slide includes a vertical notch 44 therein. The notch 44 extends completely through the flange portion 42 of the slide, and rearwardly through a portion only of the lower portion 41 of the slide.

The slide 40 is transversely slidable in the slot 30 between a first or pick-up position (FIGS. 8 and 9) wherein the notch 44 is aligned with the longitudinal slot 26 so as to be adapted to receive a fastener from the longitudinal slot 26, and to a second position (FIGS. 10 and 11) wherein the notch 44 is aligned with the discharge opening 36. Also, the flange portion 42 includes an upper edge 45 which forms a shoulder at the upper end of the notch 44 for engaging the head of the engaged fastener. The assembly 16 is preferably mounted so as to be somewhat inclined from the vertical by a bracket 47 and bolts 48, as best seen in FIG. 1, and thus the engaged fastener is adapted to fall by gravity rearwardly into the discharge slot 37 of the upper body portion 31 when the slide 40 is in its second or discharge position, and then drop downwardly through the portion of the notch 44 in the lower portion 41 of the slide and into the discharge opening 36 of the lower body portion 32 and then into the delivery line 18.

A spring 46 is mounted in a pocket 47 in the member 22 adjacent one end of the transverse slot 30 for engaging and biasing the slide 40 toward its second or discharge position. Also, a slide actuation air line 49 is connected to the member 22 and the line 49 communicates with a threaded passage 50 in the member which is aligned with the slot 30 and which slidably receives a freely movable piston 51. Air pressure in the air line 48 thus causes the slide 40 to be selectively moved toward the first or pickup position against the force of the spring 46.

The fastener feed assembly 16 of the present invention also includes a second air line means for directing a stream of air downwardly into the lower portion of the notch 44 in the slide 40 only after the slide has essentially reached its second or discharge position, and so that the stream of air flows from the notch 44 downwardly into the discharge opening 36. The second air line means includes a supply line 52 which is connected to the member 22, and an air passage 53 formed within the member 22, and which has an outlet 54 (FIG. 5) communicating with the upper surface 34 of the transverse slot 30 at a location closely adjacent the discharge slot 37. Also, the slide 40 includes an inclined guide channel 55 (FIG. 3) which communicates with that portion of the notch 44 in the lower portion 41 of the slide, for directing a stream of air from the outlet 54 into the lower portion of the notch 44 and into the discharge opening 36 when the slide is in its second or discharge position.

The apparatus 10 further comprises a source 58 of pressurized air, and two air supply lines 59, 60 connected to the source. Further, air valve means is provided which is operatively connected to the air supply line 59 and to the fastener feeding assembly 16. The air valve means comprises a conventional four way air piloted valve 61, for selectively connecting the air supply line 59 to either the slide actuation line 49 or the supply line 52 for the fastener delivery line. The valve 61 is operatively controlled by the pressure in an air control line 62 for movement between a first position wherein the air is directed only into the slide actuation line 49 to move the slide 40 of the feed apparatus to its pickup position, or a second position wherein air from the air supply line 59 is directed only to the supply line 52 and then to the fastener delivery line 18 in the manner described above. A suitable pilot control valve of the described type is presently marketed by Automatic Switch Company, Florham Park, N.J., as Model No. 8401.

Figure 12:
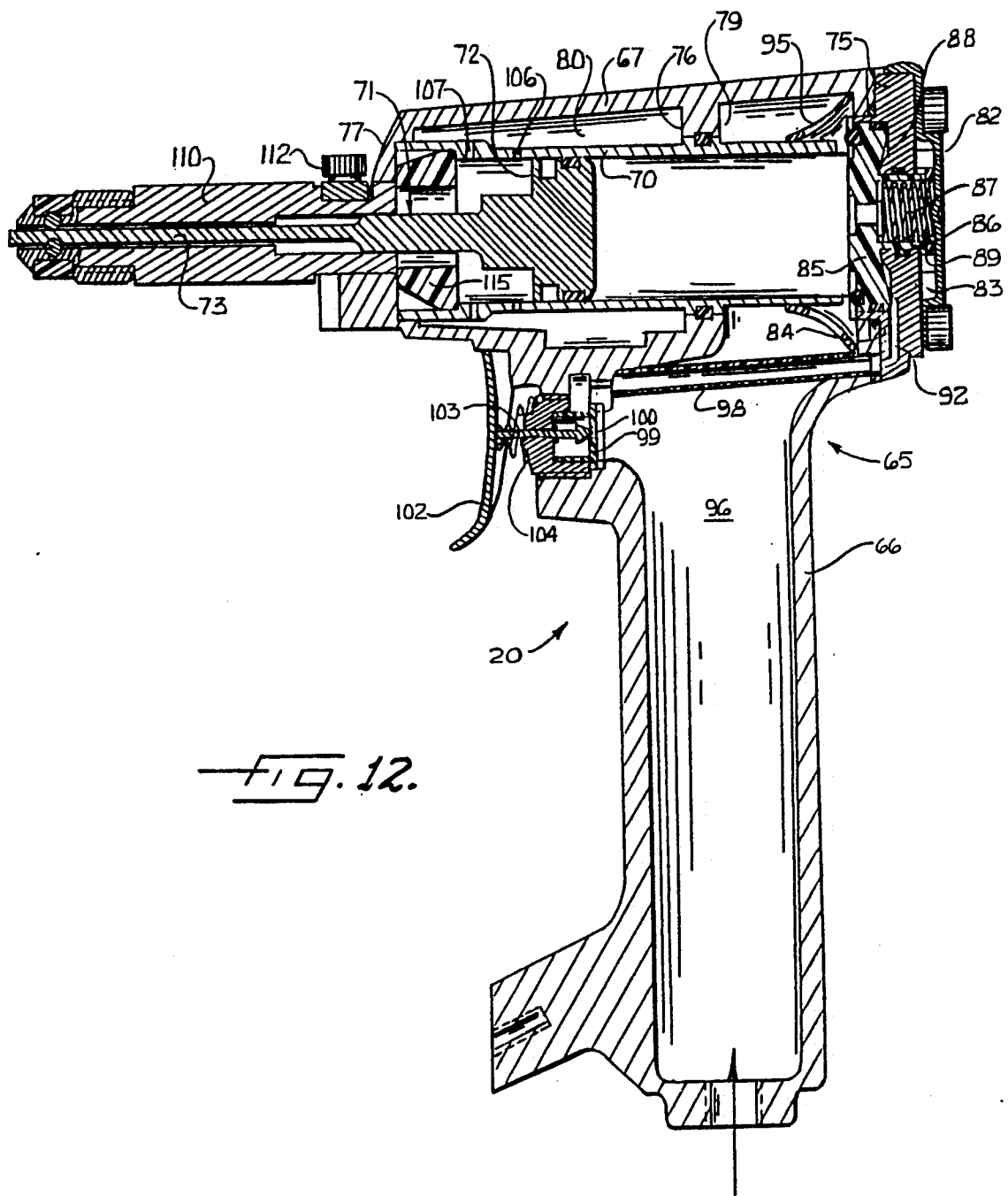
FIGS. 12 and 13 are sectional views of the driving apparatus of the present invention, and illustrating the same in the drive and feed positions respectively.
Figure 13:
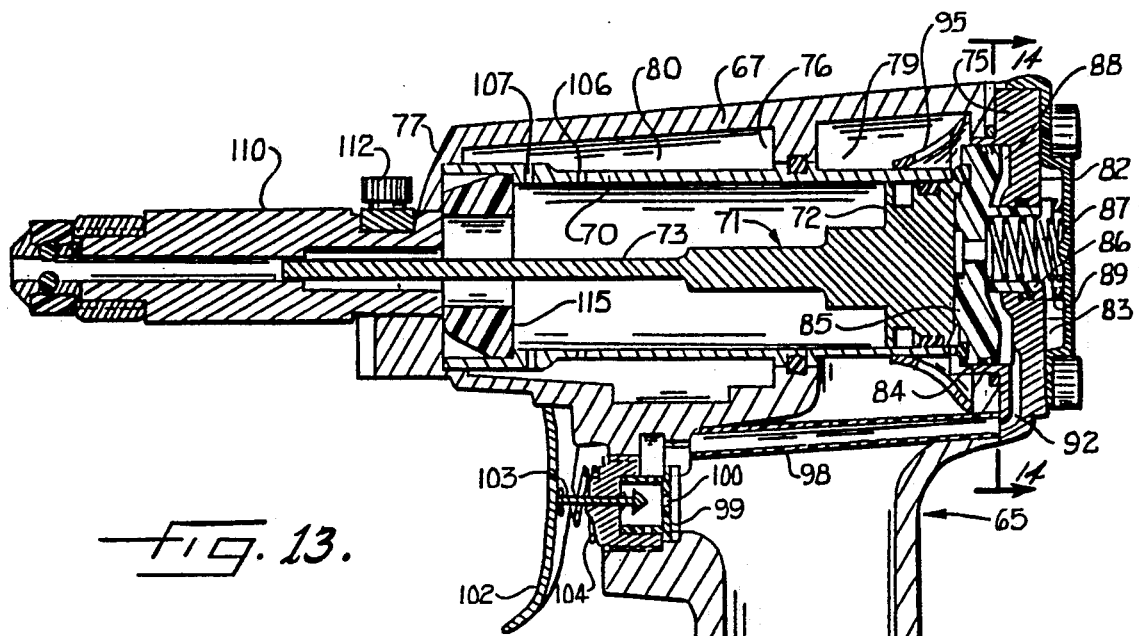

The apparatus 10 further comprises the hand held fastener driver 20. As best seen in FIGS. 12 and 13, the driver 20 comprises a housing 65 which includes a manually gripable handle portion 66 and an upper body portion 67. Both the handle portion 66 and the upper body portion 67 are hollow, and in fluid communication with each other.

The upper body portion 67 defines an internal chamber, and the internal chamber mounts a tubular sleeve 70. Also, a plunger 71, which comprises a piston 72 and an elongate drive shaft 73, is mounted within the tubular sleeve 70 for slidable movement along the axis of the sleeve. The piston 72 of the plunger is sized so as to be closely received in the sleeve.

The housing 65 further includes a removable rear end plate which defines a transverse rear end wall 75 which extends across the internal chamber adjacent the rear end of the tubular sleeve. The housing also defines an intermediate transverse wall 76 which closely surrounds a medial portion of the length of the tubular sleeve 70, and a forward transverse wall 77 which engages the forward end of the sleeve. The walls 75, 76, 77 thus define an open rear chamber 79 between the rear wall 75 and the intermediate wall 76 and an open forward chamber 80 positioned between the intermediate and forward walls. A removable end plate 82 overlies the rear side of the rear end wall 75, to thereby define an outer chamber portion 83 rearwardly of the rear wall.

Figure 14:
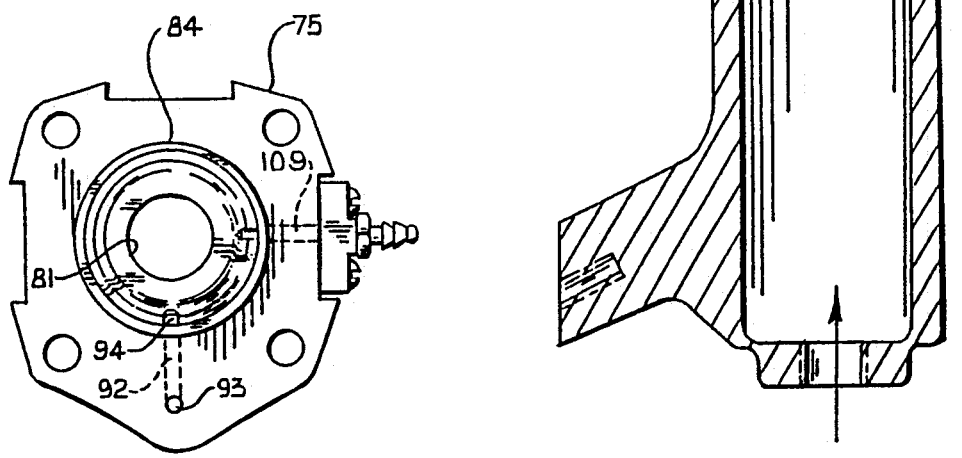
FIG. 14 is a sectional view of the rear chamber of the driving apparatus and taken substantially along the line 14—14 of FIG. 13.

As best seen in FIGS. 12-14, the rear end wall 75 includes a central opening 81 therethrough which is coaxially aligned with the sleeve 70, and the end wall 75 also includes a forwardly extending circular flange 84. The circular flange 84 slidably mounts a valve head 85 which includes a rearwardly extending sleeve 86 which is received in the central opening 81 of the end plate 75. The valve head includes a central opening, and a spring 87 is positioned coaxially within the sleeve 86 and so as to engage the end plate 82 and thereby bias the valve head forwardly. The valve head 85 is thereby mounted for slidable movement between a forward position engaging and sealably closing the rear end of the sleeve 70, and also spaced from the rear wall 75 so as to define a gap 88 therebetween (note FIG. 13), and a rearward position engaging the rear wall and spaced from the rear end of the sleeve (note FIG. 12). Thus in the rearward position of the valve head, the rear chamber 79 communicates with the rear end of the sleeve 70 and the gap 88 is not present. A sealing ring 89 is mounted so as to engage the rear end of the sleeve 86 of the valve head when the valve head is moved to its rearward position.

The rear end wall 75 includes an internal passage 92 as best seen in FIGS. 12-14, which communicates with the gap 88 when the valve head 85 is moved to its forward position as seen in FIG. 13. The passage 92 includes an inlet 93 and an outlet 94, with the outlet 94 communicating with the gap 88, and when the valve head is moved rearwardly, the outlet 94 is closed by the valve head as seen in FIG. 12.

A conically shaped retaining ring 95 is positioned between the rear end portion of the sleeve 70 and a shoulder in the housing 67, so as to prevent the rearward movement of the sleeve 70. The ring 95 includes apertures for permitting the passage of air therethrough.

An air passageway 96 extends through the handle 66 of the housing 65 and into communication with the rear chamber 79. Thus the passageway 96 and the rear chamber 79 define a common, rather large air reservoir. The lower portion of the handle is connected to the air supply line 60, for delivering pressurized air into the air passageway 96 and thus into the rear chamber 79. A pilot tube 98 is mounted in the air passageway 96 and has one end which is connected to the inlet 93 of the passage 92. The opposite end of the pilot tube is connected to a chamber which is closed by a valve plate 99. The valve plate in turn includes an opening 100 which communicates with the passageway 96. A trigger 102 is movably mounted on the handle, and the trigger is connected to a pin 103 which is positioned to selectively close the opening 100, and such that the closing of the trigger moves the pin 103 against the opening 100 to close the same. The opening of the trigger results in the spring 104 moving the pin 103 away from the opening 100 so as to open communication between the passageway 96 and the pilot tube 98.

As best seen in FIGS. 12 and 13, the forward portion of the tubular sleeve 70 includes two annular rings of relatively small openings 106, 107 which extend circumferentially about the sleeve and which communicate with the forward chamber portion. The rings of openings 106, 107 are positioned such that when the plunger has moved fully forward, i.e. to the left as seen in FIGS. 12 and 13, air passes through the openings 106 from the interior of the tubular sleeve into the forward chamber 80 to thereby pressurize the forward chamber. When the air pressure in the sleeve 70 dissipates behind the plunger, the pressurized air in the chamber 80 subsequently returns to the interior of the tubular sleeve 70 through the openings 107, and causes the plunger to return rearwardly in the tubular sleeve.

The driver 20 to the extent described above is of known design, and corresponds to the Bostitch® driver which is commercially available as Model No. T-29, from the Bostitch Division of Textron, Inc., East Greenwich, R.I.

In accordance with the present invention, the air control line 62 is connected to the rear wall 75 of the driver so as to communicate via an internal passage 109 (FIG. 14) with the gap 88 formed between the rear wall 75 and the valve head 85 when the valve head is moved forwardly into engagement with the rear end of the sleeve 70. Thus when the trigger 102 is released and the pilot tube 98 directs air into the gap, a portion of this air flows through the gap and the air control line 62 to the air valve 61. When the trigger is closed, the pressure in the gap 88 and the control line 62 dissipates and returns to atmospheric pressure.

Figure 15:
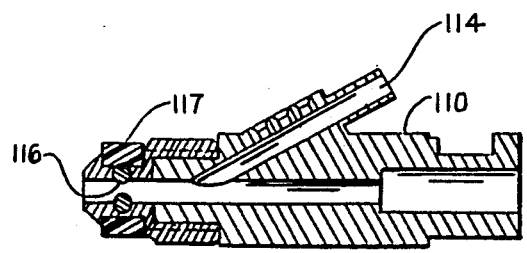
FIG. 15 is a fragmentary section view of the forward barrel portion of the driving apparatus and illustrating the fastener inlet opening.

The driver 20 further includes a forward barrel portion 110 which comprises a tubular member which is releasably mounted to the forward wall 77 of the housing by bolts 112, and so as to be coaxially aligned with the sleeve 70. The barrel portion 110 includes a fastener inlet opening 114 (FIG. 15) which is connected to the fastener delivery line 18 for serially receiving fasteners into the bore of the barrel portion. Also, a resilient annular bumper 115 is positioned in the forward end of the sleeve 70, and the drive shaft 73 of the plunger 71 extends coaxially into the barrel portion. Three fastener retaining elements or balls 116 are mounted adjacent the forward end of the tubular member. The balls 116 are resiliently mounted in radial openings which receive respective balls, so that the balls project slightly into the bore of the tubular member. Also, a resilient band 117 encircles the tubular member so as to engage and retain the balls in the openings. Thus the balls 116 engage a fastener F which is delivered to the driver, in a manner which supports the fastener in alignment with the tubular member, and also so as to permit the fastener to be released and driven into the workpiece as further described below. Further, the forward end portion of the tubular member which mounts the retaining balls is threadedly connected to the remainder of the barrel portion, to permit removal for cleaning and inspection.

Operation of the Apparatus

During operation of the apparatus, the vibratory hopper 12 is energized so as to cause the fasteners F to be delivered into the slot of the delivery chute 13, and then into the longitudinal slot 26 of the feed assembly 16.

Assuming initially that the trigger 102 of the driver 20 is in the relaxed position, the pressurized air in the passageway 96 of the driver flows through the pilot tube 98 to the gap 88, causing the valve head 85 to move forwardly against the rear end of the internal sleeve. Also, the pressurized air is then free to move through the gap 88 and into the control line 62, which in turn causes the air valve 61 to direct air into the slide actuation line 49 to thereby move the slide 40 to the pick-up position.

When the trigger is closed, the pilot tube 98 is closed, and the pressure in the gap 88 and the control line 62 dissipates. This results in the valve head 85 being moved rearwardly away from the rear end of the sleeve 70 by the pressure in the rear chamber 79. The pressurized air from the reservoir formed by the rear chamber 79 and the passageway 96 then enters the rear end of the sleeve 70, thrusting the plunger forwardly to drive a previously received fastener, and which is retained by the ball retainers 116 in the barrel portion, into a workpiece. Also, the absence of pressure in the control line 62 causes the air valve 61 to move to its second position, wherein air is directed only into the line 52. The slide 40 is thus moved to its discharge position by the spring 46, and when the slide reaches, or is closely adjacent, the discharge position, air enters the air passage 53 and is directed into the lower portion of the notch 44 in the slide and into the discharge opening 36. The fastener drops by gravity into the discharge slot 37 and then through the discharge opening 36, and the force of the air then moves the fastener through the fastener delivery line 18 into the barrel portion 110 of the driver 20, where it is engaged and held in alignment with the tubular member by the ball retainers 116.

The fact that the air does not enter the notch 44 and discharge opening 36 until the slide essentially reaches its discharge position, allows time for the fastener to drop by gravity into the discharge slot 37 and into the discharge opening 36 before the delivery line 18 becomes pressurized, and before any opportunity for the air to become turbulent in the delivery line. Thus any such interference with the gravity drop on the fastener is eliminated, and the reliability of the feed is greatly enhanced.

As noted above, the movement of the plunger to its fully forward position against the bumper 115 permits the forward chamber 80 to become momentarily pressurized by air entering through the openings 106 from the sleeve 70, which is in turn pressurized from the air entering from the rear chamber 79 and passageway 96. When the pressure behind the piston 72 dissipates, the pressurized air in the chamber 80 returns into the sleeve in front of the piston 72 through the openings 107 to return the plunger to its initial rearward position. Thus the drive shaft 73 is withdrawn sufficiently to permit the delivered fastener to enter the barrel portion of the driver. The cycle of operation may then be repeated by again pulling the trigger.

In the drawings and specification, there has been set forth a preferred embodiment of the invention, and although specific terms are employed, they are used in a generic and descriptive sense only and not for purposes of limitation.

That which is claimed is:

1. An automatic fastener feeding and driving apparatus comprising
   a source of pressurized air, and air supply line connected to said source,
   fastener supply means including an outlet chute, and vibratory means for serially supplying fasteners along said chute,
   fastener feeding means connected to said outlet chute for serially delivering fasteners from said chute to a fastener delivery line, and including a slide mounted for movement between a pick-up position engaging the leading fastener in said chute and a discharge position wherein the engaged fastener is moved into said fastener delivery line, a fastener driver comprising a housing which includes a forward barrel portion, said barrel portion having a fastener inlet opening which is connected to said fastener delivery line for receiving a fastener into said barrel portion, and a plunger which is mounted for longitudinal movement within said housing so as to be adapted to move forwardly through said barrel portion and drive a fastener which is positioned in said barrel portion into a workpiece, air valve means operatively connected to said air supply line and to said fastener feeding means, and being selectively movable between a first position wherein said feeding means is moved to its pick-up position, and a second position wherein said feeding means is moved to its discharge position and air is injected into said fastener delivery line from said source of pressurized air to deliver a fastener therein through said inlet opening and into said barrel portion of said driver, and trigger means mounted on said driver for when closed causing said plunger to rapidly move forwardly through said barrel portion of said driver and causing said air valve means to move to its first position, and when open causing said air valve means to move to said second position and said plunger to return in the rearward direction.

2. The apparatus as defined in claim 1 wherein said air supply line is connected to said driver, and said trigger means includes an air control line connected between said driver and said air valve means, and control means in said driver for interconnecting said control line to said air supply line when said trigger is moved to one of said open and closed positions, and for closing such interconnection when the trigger is moved to the other of said open and closed positions.

3. The apparatus as defined in claim 2 further comprising a tubular sleeve coaxially mounting said plunger therein, and wherein said control means in said driver comprises a rear chamber in said housing which communicates with the rear end of said sleeve, an internal air passageway in said housing which interconnects said air supply line with said rear chamber and thus the rear end of said sleeve, valve means for selectively opening and closing the rear end of said sleeve, and trigger means including a trigger movable between an open and closed position for when closed moving said valve means to open the rear end of said sleeve to cause said plunger to be thrust forwardly and to close said air control line, and for when open moving said valve means to close the rear end of said sleeve and to open said air control line.

4. The apparatus as defined in claim 1 wherein said forward barrel portion of said driver comprises a tubular member, a plurality of fastener holding elements mounted circumferentially about said tubular member, and means for resiliently mounting said fastener holding elements to the tubular member for limited radial movement into said tubular member, and such that the fastener holding elements resiliently engage a fastener in said tubular member.

5. The apparatus as defined in claim 4 wherein said fastener holding elements are balls, and said mounting means includes radial openings in said tubular member for receiving respective balls, and a resilient band encircling the tubular member so as to engage and retain the balls in the openings.

6. The apparatus as defined in claim 1 wherein said housing of said driver has an internal chamber, with said internal chamber mounting a tubular sleeve so that said sleeve is coaxial with said barrel portion, with said plunger being mounted in said tubular sleeve for slidable movement along the axis of the sleeve, and with said plunger including a piston which is sized to be closely received in said sleeve, said housing further including a rear transverse wall extending across said internal chamber adjacent the rear end of said tubular sleeve, an intermediate transverse wall closely surrounding a medial portion of the length of said tubular sleeve, and a forward transverse wall closing the forward end of said sleeve and so as to define a rear chamber portioned between said rear and intermediate walls and a forward chamber positioned between said intermediate and forward walls, and a valve head mounted between said rear wall and the rear end of said sleeve and for slidable movement between a forward position engaging said rear end of said sleeve and spaced from said rear wall so as to define a gap therebetween, and a rearward position engaging said rear wall and spaced from said rear end of said sleeve and so that said gap is not present and said rear chamber communicates with the rear end of said sleeve.

7. The apparatus as defined in claim 6 wherein said driver further comprises air passageway means within said housing and operatively connected to said air supply line means for delivering pressurized air to said rear chamber of said housing, and said trigger means includes a pilot tube connecting said air passageway means to said gap formed when said valve head is in said forward position, a trigger moveable between a closed position closing said pilot tube and an open position wherein said pilot tube is open to deliver pressurized air to said gap, and an air control line communicating with said gap and connected to said air valve means, and whereby pressurized air is delivered to said gap and to said air control line and to said air valve means only when said trigger is open.

8. The apparatus as defined in claim 7 wherein said tubular sleeve includes relatively small openings which communicate with said forward chamber, and such that the forward thrust of said plunger causes air to move from the interior of said tubular sleeve into said forward chamber and thereby pressurize the same, and the pressurized air in said forward chamber subsequently causes the plunger to return rearwardly in said tubular sleeve.

9. An automatic fastener feeding and driving apparatus comprising a source of pressurized air, and air supply line connected to said source, fastener supply means including an outlet chute, and vibratory means for serially supplying fasteners along said chute, fastener feeding means connected to said outlet chute for serially delivering fasteners from said chute to a fastener delivery line, said feeding means including a body member having a longitudinal slot adapted to serially receive fasteners from the delivery chute, a discharge opening positioned transversely from said slot, a fastener delivery line connected to said discharge opening, and a slide mounted for transverse sliding movement in said body member, said slide having a front transverse surface facing said longitudinal slot, and with said front transverse surface having a notch therein which is adapted to receive the shank of a fastener therein, and with said slide being transversely slidable between a first position wherein said notch is aligned with said longitudinal slot so as to be adapted to receive a fastener from said longitudinal slot, and a second position wherein said notch is aligned with said discharge opening, spring biasing means for biasing said slide toward one of said first and second positions, a first air line for when pressurized moving said slide toward the other of said first and second position against the force of said spring biasing means, and a second air line within said body member and including an outlet opening in said body member and a communicating guide channel in said slide so as to be adapted to direct a stream of air into only the portion of the notch which is immediately adjacent said discharge opening and then into said discharge opening only when said slide is essentially in said second position, a fastener driver comprising a housing which includes a forward barrel portion, said barrel portion having a fastener inlet opening which is connected to said fastener delivery line for receiving a fastener into said barrel portion, and driver means which is mounted for longitudinal movement within said housing so as to be adapted to move forwardly through said barrel portion and drive a fastener which is positioned in said barrel portion into an adjacent workpiece, air valve means operatively connected to said air supply line and to said fastener feeding means, and being selectively movable between a first position wherein said first air line is connected to said air supply line, and a second position wherein said second air line is connected to said air supply line and so that air is injected into said discharge opening and said fastener delivery line to deliver a fastener therein through said inlet opening and into said barrel portion of said driver, and trigger means mounted on said driver for when closed causing said plunger to rapidly move forwardly within said barrel portion of said driver and causing said air valve means to move to its first position, and when open causing said air valve means to move to said second position and said plunger to return in a rearward direction.

10. The apparatus as defined in claim 9 wherein said air supply line is connected to said driver, and said trigger means includes an air control line connected between said driver and said air valve means, and control means in said driver for interconnecting said control line to said air supply line when said trigger is moved to one of said open and closed positions, and for closing such interconnection when the trigger is moved to the other of said open and closed positions.

11. A fastener feed apparatus adapted for serially feeding fasteners of the type having a shank and an enlarged head at one end of the shank, and from a fastener delivery chute to a powered fastener driver or the like, said feed apparatus comprising a body member having a longitudinal slot which extends downwardly thereinto and so as to be adapted to serially receive the fasteners from the delivery chute with the shanks thereof depending into said slot, a transverse slot communicating at right angles with said longitudinal slot, and a downwardly extending discharge opening communicating with said transverse slot at a location transversely spaced from said longitudinal slot, a slide mounted for transverse sliding movement in said transverse slot, said slide having a front transverse surface facing said longitudinal slot, and with said front transverse surface having a notch therein which is adapted to receive the shank of a fastener therein, and with said slide being transversely slidable between a first position wherein said notch is aligned with said longitudinal slot so as to be adapted to receive a fastener from said longitudinal slot, and a second position wherein said notch is aligned with said discharge opening, spring biasing means for biasing said slide toward one of said first and second positions, first air line means for selectively moving said slide toward the other of said first and second positions against the force of said spring biasing means, and second air line means for directing a stream of air downwardly into the lower portion of said notch in said slide only when said slide is essentially in said second position, and so that the stream of air flows from said notch downwardly into said discharge opening.

12. The apparatus as defined in claim 11 wherein said second air line means includes an air line within said body member and having an outlet communicating with said transverse slot, and a guide channel in said slide for directing a stream of air from said outlet into the lower portion of said notch and into said discharge opening when said slide is in said second position.

13. The apparatus as defined in claim 11 wherein said body member includes an upper body portion above said transverse slot, and a lower body portion below said transverse slot, with the upper and lower body portions having respective forwardly facing surfaces, and with said downwardly extending discharge opening being positioned in said lower body portion, and further including a discharge slot formed in the forwardly facing surface of said upper body portion and which is aligned with said discharge opening and parallel to said notch in said slide, and wherein said slide is of generally "b" shape in cross section and includes a lower portion which is of generally rectangular cross-section and configured to be closely received in said transverse slot, and a flange portion which extends upwardly from one side of said lower portion, with the outer face of said flange portion defining a portion of said front transverse surface of said slide and with the opposite face of said flange portion overlying said forwardly facing surface of said upper body portion of said body member, and with said notch of said slide extending completely through said flange portion and rearwardly through a portion only of said lower portion of said slide, and with said flange portion including an upper edge which forms a shoulder at the upper end of said notch for engaging the head of an engaged fastener, and such that an engaged fastener is adapted to fall into said discharge slot of said upper body portion when said slide is in said second position, and then drop through the portion of said notch in said lower portion of said slide and into said discharge opening.

14. The apparatus as defined in claim 13 wherein said transverse slot of said body member includes parallel upper and lower edge surfaces which closely receive said lower portion of said slide therebetween, and wherein said second air line means includes an air line within said body member and having an outlet in said upper edge surface at a location closely adjacent said discharge slot on said forwardly facing surface of said upper body member.

15. The apparatus as defined in claim 14 wherein said air line further includes a guide channel in said slide so as to be adapted to direct a stream of air from said outlet into the lower portion of said notch when said slide is in said second position.

16. The apparatus as defined in claim 15 wherein said body member further includes a block-like member which includes an inner end surface and an outer end surface, with said longitudinal slot extending between said inner and outer end surfaces, and with said inner end surface overlying said outer face of said flange portion of said slide and also overlying said forwardly facing surfaces of said upper and lower body portions of said body member.

17. The apparatus as defined in claim 14 wherein said lower portion of said slide has a length in the transverse direction less than that of said transverse slot, and such that said outlet of said second air line means is spaced from said slide when said slide is in said first position and said second air line means is then adapted to freely exhaust into said transverse slot.

18. The apparatus as defined in claim 11 wherein said spring biasing means biases said slide toward said second position, and said first air line means is adapted to move said slide to said first position.

* * * * *